(12) United States Patent
Baughman et al.

(10) Patent No.: US 10,257,071 B2
(45) Date of Patent: Apr. 9, 2019

(54) DYNAMIC NETWORK MONITORING

(71) Applicant: INTERNATIONAL BUSINESS MACHINES CORPORATION, Armonk, NY (US)

(72) Inventors: Aaron K. Baughman, Silver Spring, MD (US); Richard A. Locke, Cary, NC (US); Brian M. O'Connell, Cary, NC (US); Brian J. Snitzer, Lancaster, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/624,742

(22) Filed: Jun. 16, 2017

(65) Prior Publication Data

US 2017/0289010 A1    Oct. 5, 2017

Related U.S. Application Data

(60) Continuation of application No. 15/162,749, filed on May 24, 2016, now Pat. No. 9,722,907, which is a
(Continued)

(51) Int. Cl.
*G06F 15/173* (2006.01)
*H04L 12/26* (2006.01)
(Continued)

(52) U.S. Cl.
CPC .......... *H04L 43/16* (2013.01); *G06F 9/45533* (2013.01); *G06F 9/45558* (2013.01);
(Continued)

(58) Field of Classification Search
CPC .......................... G06F 9/45558; H04L 47/822
(Continued)

(56) References Cited

U.S. PATENT DOCUMENTS

| 6,782,499 B2 | 8/2004 | Osada et al. |
| 7,093,143 B2 | 8/2006 | Ito et al. |

(Continued)

FOREIGN PATENT DOCUMENTS

| CA | 2401057 | 9/2001 |
| CN | 102135914 | 7/2011 |

(Continued)

OTHER PUBLICATIONS

"Scalable Traffic-Aware Virtual Machine Management for Cloud Data Centers"—Tso et al, School of Computing Science, University of Glasgow, Mar. 2013 (Year: 2013).*
(Continued)

*Primary Examiner* — Randy A Scott
(74) *Attorney, Agent, or Firm* — William Hartwell; Andrew M. Calderon; Roberts Mlotkowski Safran Cole & Calderon, P.C.

(57) ABSTRACT

Approaches for monitoring performance in a networked environment are provided. An approach includes monitoring, using a first metric, performance of a first host running a virtual machine. The approach also includes determining, using a computer device, a second metric based on the virtual machine being migrated from the first host to a second host, wherein the second metric is a function of: (i) the first metric and (ii) a comparison of the first host and the second host. The approach further includes monitoring, using the second metric, performance of the second host running the virtual machine.

19 Claims, 6 Drawing Sheets

Related U.S. Application Data division of application No. 14/247,594, filed on Apr. 8, 2014, now Pat. No. 9,385,934.

(51) Int. Cl.
*H04L 12/911* (2013.01)
*G06F 9/455* (2018.01)

(52) U.S. Cl.
CPC .......... *H04L 43/08* (2013.01); *H04L 43/0876* (2013.01); *H04L 47/822* (2013.01); *G06F 2009/4557* (2013.01); *G06F 2009/45591* (2013.01); *G06F 2009/45595* (2013.01)

(58) Field of Classification Search
USPC ........ 709/217, 223, 224, 226; 370/328, 329, 370/338
See application file for complete search history.

(56) References Cited

U.S. PATENT DOCUMENTS

| | | | |
|---|---|---|---|
| 7,141,883 B2 | 11/2006 | Wei et al. | |
| 7,161,828 B2 | 1/2007 | Cummings et al. | |
| 7,254,797 B2 | 8/2007 | Garlepp | |
| 7,489,628 B2 | 2/2009 | Pirbhai et al. | |
| 8,571,467 B2 | 10/2013 | Uusitalo et al. | |
| 8,578,028 B2 | 11/2013 | Grigsby et al. | |
| 8,612,599 B2 | 12/2013 | Tung et al. | |
| 8,621,080 B2 | 12/2013 | Iyoob et al. | |
| 8,667,020 B2 | 3/2014 | Zhaofu et al. | |
| 9,317,336 B2 | 4/2016 | Alicherry | |
| 9,385,934 B2 | 7/2016 | Baughman et al. | |
| 9,705,779 B2 | 7/2017 | Baughman et al. | |
| 9,722,907 B2 | 8/2017 | Baughman et al. | |
| 10,009,371 B2* | 6/2018 | Antony | G06F 21/554 |
| 2005/0251802 A1 | 11/2005 | Bozek et al. | |
| 2007/0019585 A1 | 1/2007 | Chiu et al. | |
| 2008/0256538 A1 | 10/2008 | Carter et al. | |
| 2009/0265707 A1 | 10/2009 | Goodman et al. | |
| 2010/0083138 A1 | 4/2010 | Dawson et al. | |
| 2011/0112441 A1 | 5/2011 | Burdea | |
| 2012/0005148 A1 | 1/2012 | Horvitz et al. | |
| 2012/0311657 A1 | 12/2012 | Boldyrev et al. | |
| 2012/0329384 A1 | 12/2012 | Boldyrev et al. | |
| 2013/0073490 A1 | 3/2013 | Baughman et al. | |
| 2013/0086431 A1 | 4/2013 | Arndt et al. | |
| 2013/0219067 A1 | 8/2013 | Boss et al. | |
| 2013/0254374 A1 | 9/2013 | Bogdany et al. | |
| 2013/0263019 A1 | 10/2013 | Castellanos et al. | |
| 2013/0263117 A1 | 10/2013 | Konik et al. | |
| 2013/0273959 A1 | 10/2013 | Wu et al. | |
| 2013/0275961 A1 | 10/2013 | Anderson et al. | |
| 2013/0290542 A1 | 10/2013 | Watt et al. | |
| 2013/0290598 A1 | 10/2013 | Fiske et al. | |
| 2014/0006377 A1 | 1/2014 | Astore | |
| 2014/0040883 A1 | 2/2014 | Tompkins | |
| 2014/0047272 A1 | 2/2014 | Breternitz et al. | |
| 2014/0053226 A1 | 2/2014 | Fadida et al. | |
| 2014/0055458 A1 | 2/2014 | Bogdany et al. | |
| 2014/0059226 A1 | 2/2014 | Messerli et al. | |
| 2014/0079297 A1 | 3/2014 | Tadayon et al. | |
| 2014/0165063 A1 | 6/2014 | Shiva et al. | |
| 2015/0169352 A1* | 6/2015 | Shi | H04L 67/10 718/1 |
| 2015/0288592 A1 | 10/2015 | Baughman et al. | |
| 2016/0006640 A1 | 1/2016 | Masuda et al. | |
| 2016/0269267 A1 | 9/2016 | Baughman et al. | |
| 2016/0269268 A1 | 9/2016 | Baughman et al. | |
| 2017/0279704 A1 | 9/2017 | Baughman et al. | |

FOREIGN PATENT DOCUMENTS

| | | |
|---|---|---|
| CN | 102385719 | 3/2012 |
| CN | 103036974 | 4/2013 |
| CN | 103095533 | 5/2013 |
| CN | 103220365 | 7/2013 |
| CN | 103577268 | 2/2014 |
| WO | 2001080158 | 10/2001 |
| WO | 201310262 | 1/2013 |
| WO | 201339555 | 3/2013 |

OTHER PUBLICATIONS

"Maximizing Virtual Machine Performance"—Mattias Sundling, Quest Software, Inc., Dec. 2010 http://www.vmware.com/files/pdf/techpaper/vsp_41_perf_memory_mgmt.pdf.

Chen et al., "Parameter Selection for Sub-hyper-sphere Support Vector Machine", Department of Computer Science & Technology, Third International Conference on Natural Computation (ICNC 2007), 4 pages.

Lin-cheng Zhou et al.,"QPSO-Based Hyper-Parameters Selection for LS-SVM Regression", Fourth International Conference on Natural Computation, 2008 IEEE, 4 pages.

Jeong et al., "Adaptive response mechanism based on the hybrid simulation and optimization for the real time event management", 2009 International Conference on New Trends in Information and Service Science, 6 pages.

Deusen et al.,"The Elements of Nature:Interactive and Realistic Techniques", University of Constance, Germany, Article 32, Jan. 2004. 406 pages.

Abraham et al.,"Survey of Spatio-Temporal Databases", Advanced Computing Research Centre, School of Computer and Information Science, University of South Australia, 1999 Kluwer Academic Publishers, Boston, 39 pages.

Ullah et al., "Fuzzy Monte Carlo Simulation using point-cloud-based probability-possibility transformation", The Society for Modeling and Simulation International (SCS), vol. 89 Jul. 2013, 17 pages.

Babu et al.,Recovery and visualization of 3D structure of chromosomes from tomographic reconstruction images, EURASIP Journal of Applied Signal Processing, vol. 2006, Article ID 45684, 13 pages.

Zhou et a.,"Data-Parallel Octrees for Surface Reconstruction", IEEE Transactions on Visualization and Computer Graphics, vol. 17, No. 5, May 2011, 13 pages.

Ruthven et al., "Constructions of dynamic geometry: A study of the interpretative flexibility of educational software in classroom practice", Computers & Education 51, 2008, 21 pages.

Raad et al.,"Achieving Sub-Second Downtimes in Internet-wide Virtual Machine Live Migrations in LISP Networks", IFIP/IEEE International Symposium on Integrated Network Management (IM2013), 8 Pages.

Chen et al.,"Fitting a Surface to 3-D Points Using an Inflating Balloon Model", Institute for Robotics and Intelligent Systems, University of Southern California, 1994 IEEE, 8 pages.

Jun Zhu et al., "Twinkle: A Fast Resource Provisioning Mechanism for Internet Services", IEEE INFOCOM, 2011, pp. 802-810.

Sivadon Chaisiri et al., "Optimization of Resource Provisioning Cost in Cloud Computing", IEEE Transactions on Services Computing, Apr.-Jun. 2012, vol. 5, No. 2, pp. 164-177.

Rak et al., "Cloud-based Concurrent Simulation at Work: Fast Performance Prediction of Parallel Programs", IEEE 21st International WETICE, 2012, pp. 137-142.

Janiesch et al., "Business Activity Management for Service Networks in Cloud Environments", M W4SOC, Dec. 12, 2011; 6 Pages.

Antonescu et al., "Dynamic SLA Management with Forecasting Using Multi-Objective Optimization", Communication and Distributed Systems (CDS) Research Group, 7 Pages, 2013.

Davidson, "Beyond Fun: Serious Games and Media", ETC Press, 2008; 199 Pages.

Bonebakker, "Finding Representative Workloads for Computer System Design", 2007; 292 Pages.

Owayedh, M.S., et al., "Identification of Temperature and Social Events Effects on Weekly Demand Behavior", IEEE, 2000, pp. 2397-2402.

Weinman, J., "Time is money: the value of on-demand", JoeWeinman.com, Jan. 7, 2011, 30 pages.

(56) References Cited

OTHER PUBLICATIONS

Weng. Y., et al., "Price spike forecasting using concept-tree approach based on cloud model", IEEE, 2009, Abstract.
Tirado, J.M., et al., "Predictive Data Grouping and Placement for Cloud-Based Elastic Server Infrastructures", IEEE, 2011, Abstract.
Paris, J.F., et al., "Delayed Chaining: A Practical P2P Solution for Video-on-Demand", IEEE, 2012, Abstract.
Jiu, R., et al., "A predictive judgment method for WLAN attacking based on cloud computing environment", IEEE, 2010, Abstract.
Lagar-Cavilla, HA, et al., "SnowFlock: Virtual Machine Cloning as a First-Class Cloud Primitive", ACM Transactions on Computer Systems (TOGS) Journal, 2011, 51 pages.
Terzis, A .. et al., "Wireless Sensor Networks for Soil Science", International Journal of Sensor Networks, vol. 7, Issue 1/2, Feb. 2010, 18 pages.
Erik Blasch et al., "Information Fusion in a Cloud-Enabled Environment" "Approved for Public Realease; Distribution Unlimited: 88ABW-2013-1114, Mar. 8, 2013", 25 pages.
Bontcheva et al.,"GATECloud.net: a platform for large-sclae,open-source text processing on the cloud" Phil. Trans.R Soc. A 2013371,20120071, Dec. 10, 2012, 14 pages.
Cai et al.,"A Cognitive Platform for Mobile Cloud Gaming", Cloud computing Technology and Science(CloudCom), 2013 IEEE 5th International Conference vol. 1, Publication Year 2013, pp. 72-79.
Georgakopoulos et al .. "Cognitive cloud-oriented wireless networks for the Future Internet" . . . Wireless Communications and Networking Conference Workshops (WCNCW). 2012 IEEE. pp. 431-435.
Jivanadham, L.B. et al.,"Cloud Cognitive Authenticator (CCA): A public cloud computing authentication mechanism", Informatics, Electronics & Vision (ICIEV), 2013 International Conference on May 17-18, 2013, pp. 1-6.
Wang et al., "Optimizing the cloud platform performance for supporting large-scale cognitive radio networks", Wireless Communications and Networking Conference (WCNC), 2012 IEEE Apr. 1-4, 2012, 3255-3260 pages.
Chun-Hsien et al.,"Cooperative spectrum sensing in TV White Spaces: When Cognitive Radio meets Cloud", Computer Communications Workshops (Infocom Wkshps), 2011 IEEE Conference on Apr. 10-15, 2011, 672-677 pages.
Park et al.,"Cognitive cryptography plugged compression for SSL TLS-based cloud computing services" Journal ACM Transactions on Internet Technology (TOIT), vol. 11 Issue 2, Dec. 2011.
Lewis et al.,"Opportunities in cloud computing for people with cognitive disabilities: designer and user perspective", UAHCI'11 Proceedings of the 6th international conference on Universal access in human-computer interaction: users diversity—vol. Part II pp. 326-331, 2011.
Hoyhtya et al., "Cognitive engine: design aspects for mobile clouds", CogART '11 Proceedings of the 4th International Conference on Cognitive Radio and Advanced Spectrum Management Article No. 32, 2011.
Beloglazov et al., "Adaptive Threshold-Based Approach for Energy Efficient Consolidation of Virtual Machines in Cloud Data Centers", Proceedings of the 8th International Workshop on Middleware for Grids, Clouds and e-Science, Nov. 29-Dec. 3, 2010; 6 Pages.
Jain et al., "A Threshold Band Based Model for Automatic Load Balancing in Cloud Environment", Cloud Computing in Emerging Markets (CCEM), 2013, pp. 1-7.
"Live Migration of Virtual Machines"—Clark et al, University of Cambridge, Department of Computer Science, Feb. 2005 http://www.cl.cam.ac.uk/research/srg/netos/papers/2005-migration-nsdi-pre.pdf.
List of IBM Patents or Patent Applications Treated as Related 1 page.
Office Action dated Jun. 19, 2018 in related U.S. Appl. No. 15/613,856, 13 pages.
Notice of Allowance in related U.S. Appl. No. 15/613,856 dated Nov. 15, 2018, 9 pages.
"Algorithms for Distributed Functional Monitoring"—Cormode et al, Hong Kong University of Science & Technology, Dept. of Computer Science, Jun. 2008 https://www.cse.ust.hk/-yike/soda08.pdf, 10 pages.
List of IBM Patents or Patent Applications Treated as Related dated Feb. 13, 2019, 1 page.
Specification "Dynamic Network Monitoring" and Drawings in related U.S. Appl. No. 16/263,798, filed Jan. 31, 2019, 43 pages.
Specification "Dynamic Network Monitoring" and Drawings in related U.S. Appl. No. 16/272,672, filed Feb. 11, 2019, 44 pages.

\* cited by examiner

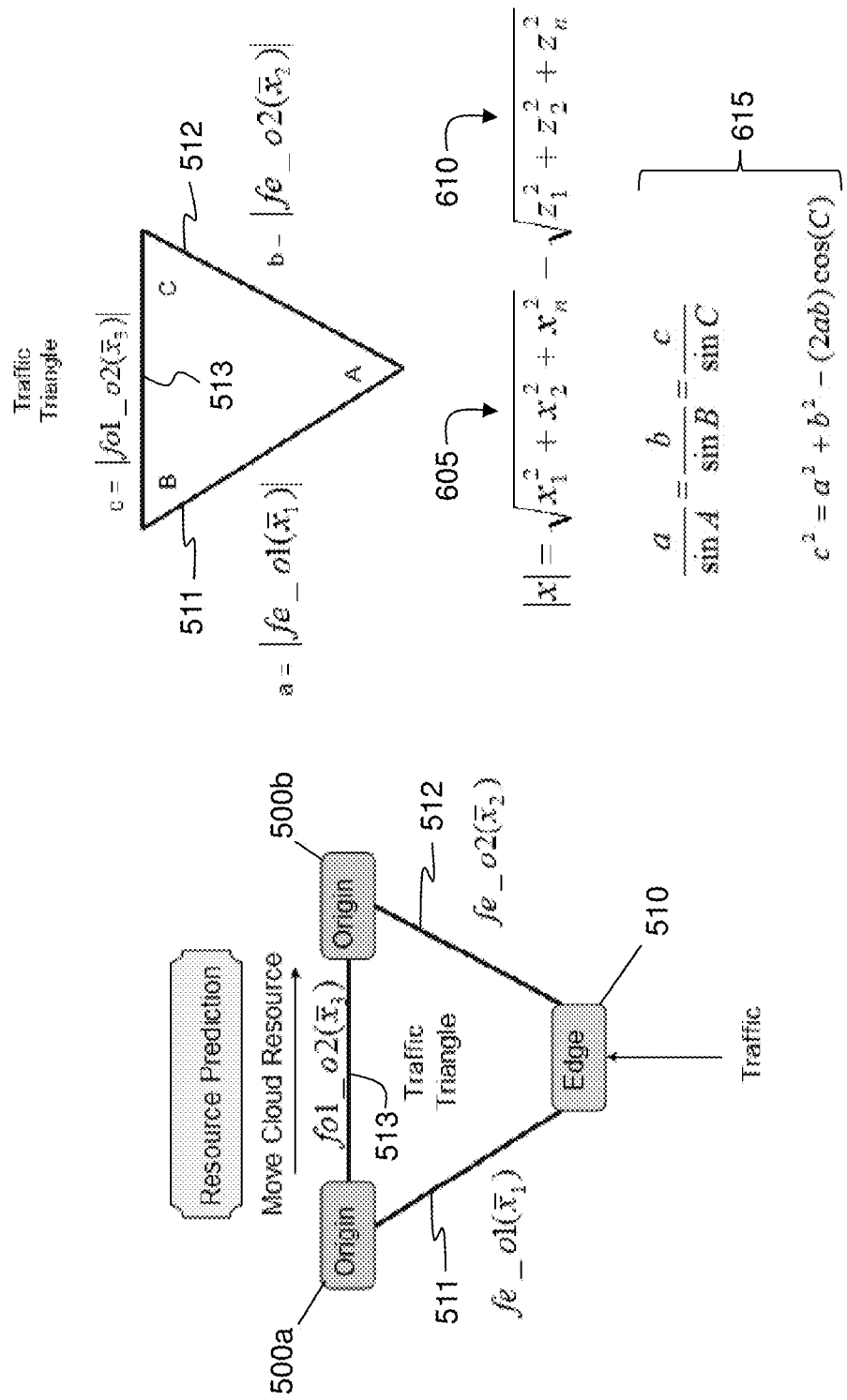

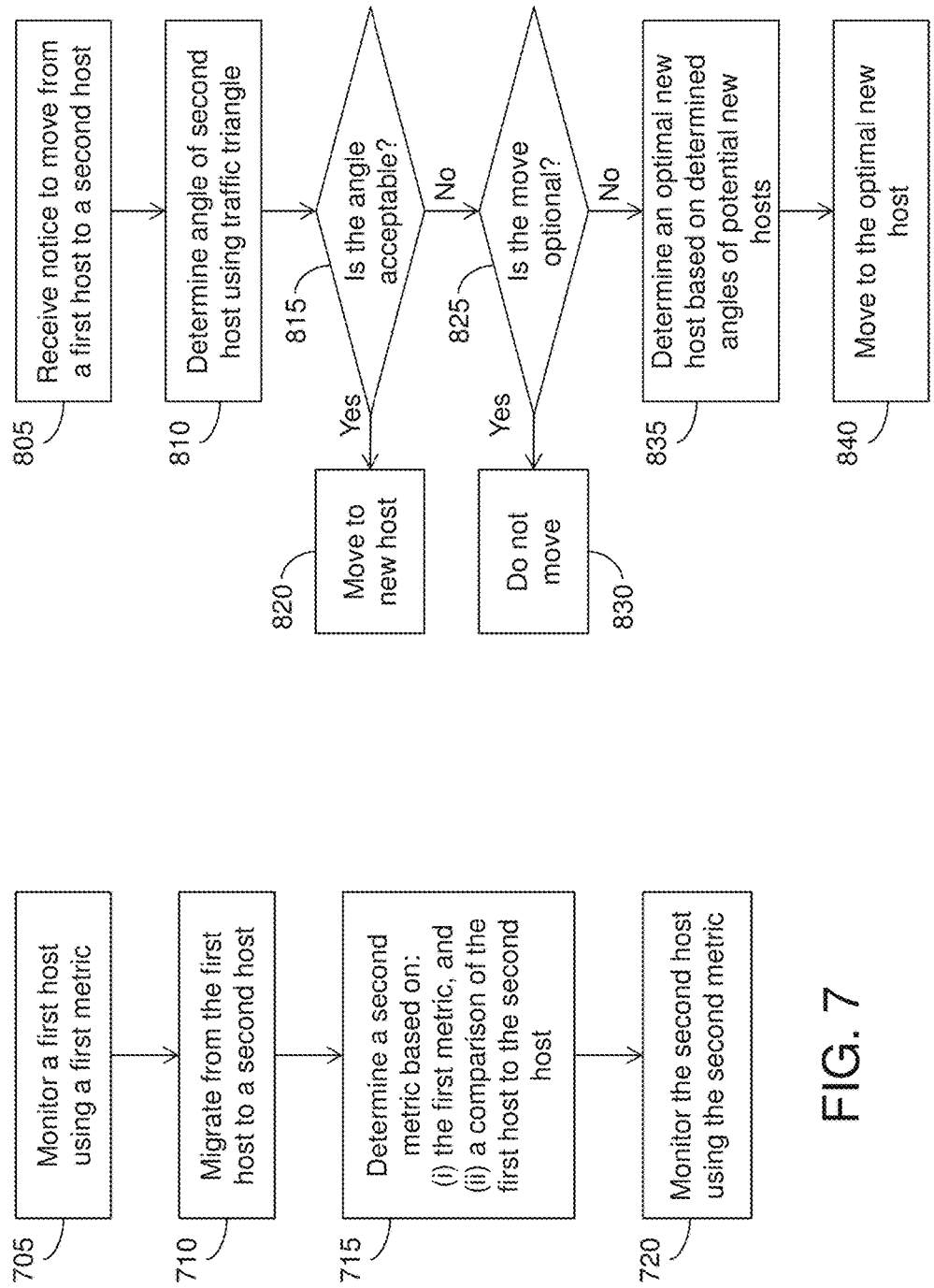

DYNAMIC NETWORK MONITORING

TECHNICAL FIELD

The present invention generally relates to monitoring performance in a networked environment and, more particularly, to dynamically monitoring performance of different resources in a cloud environment.

BACKGROUND

Distributed network computing, such as cloud computing, typically involves service providers that maintain and provide shared computing resources that clients utilize via a communication network. For example, a client that owns or operates a website may utilize cloud resources to function as one or more website servers that host the website. The resources that are utilized by the client may include hardware and/or software that are part of a larger network of shared resources, e.g., a cloud environment, which is maintained by a service provider.

SUMMARY

In a first aspect of the invention, there is a method for monitoring performance in a networked environment. The method includes monitoring, using a first metric, performance of a first host running a virtual machine. The method also includes determining, using a computer device, a second metric based on the virtual machine being migrated from the first host to a second host, wherein the second metric is a function of: (i) the first metric and (ii) a comparison of the first host and the second host. The method further includes monitoring, using the second metric, performance of the second host running the virtual machine.

In a further aspect of the invention, there is a computer program product for monitoring performance in a networked environment. The computer program product includes a computer readable storage medium having program instructions embodied therewith. The program instructions are executable by a computer device to cause the computer device to: automatically adjust, by the computer device, a monitoring threshold used in monitoring performance of a host running a virtual machine based on the virtual machine being migrated from a first host to a second host.

In a further aspect of the invention, there is a system for monitoring performance in a networked environment. The system includes a CPU, a computer readable memory and a computer readable storage medium. Additionally, the system includes one or more program instructions. The program instructions are operable to: receive notice of a move of a virtual machine from a first host to a second host; determine, based on the receiving the notice, an angle of a traffic triangle including the first host, the second host, and an edge node; and determine whether the move is acceptable based on comparing the determined angle to at least one threshold. The program instructions are stored on the computer readable storage medium for execution by the CPU via the computer readable memory.

In further aspects of the invention, a method for deploying a system for monitoring performance in a networked environment comprises providing a computer infrastructure being operable to provide the functionality of the present invention as described in any combination of features described below and/or shown in the figures. A method may include deploying a computer infrastructure for monitoring performance in a networked environment, wherein the computer infrastructure is configured to: monitor, using a first metric, performance of a first host running a virtual machine; determine, using a computer device, a second metric based on the virtual machine being migrated from the first host to a second host, wherein the second metric is a function of: (i) the first metric and (ii) a comparison of the first host and the second host; and monitor, using the second metric, performance of the second host running the virtual machine.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 4-6 depict diagrammatic representations of resource monitoring in accordance with aspects of the invention.

FIGS. 7 and 8 show exemplary flow diagrams of processes in accordance with aspects of the invention.

DETAILED DESCRIPTION

Figure 1:
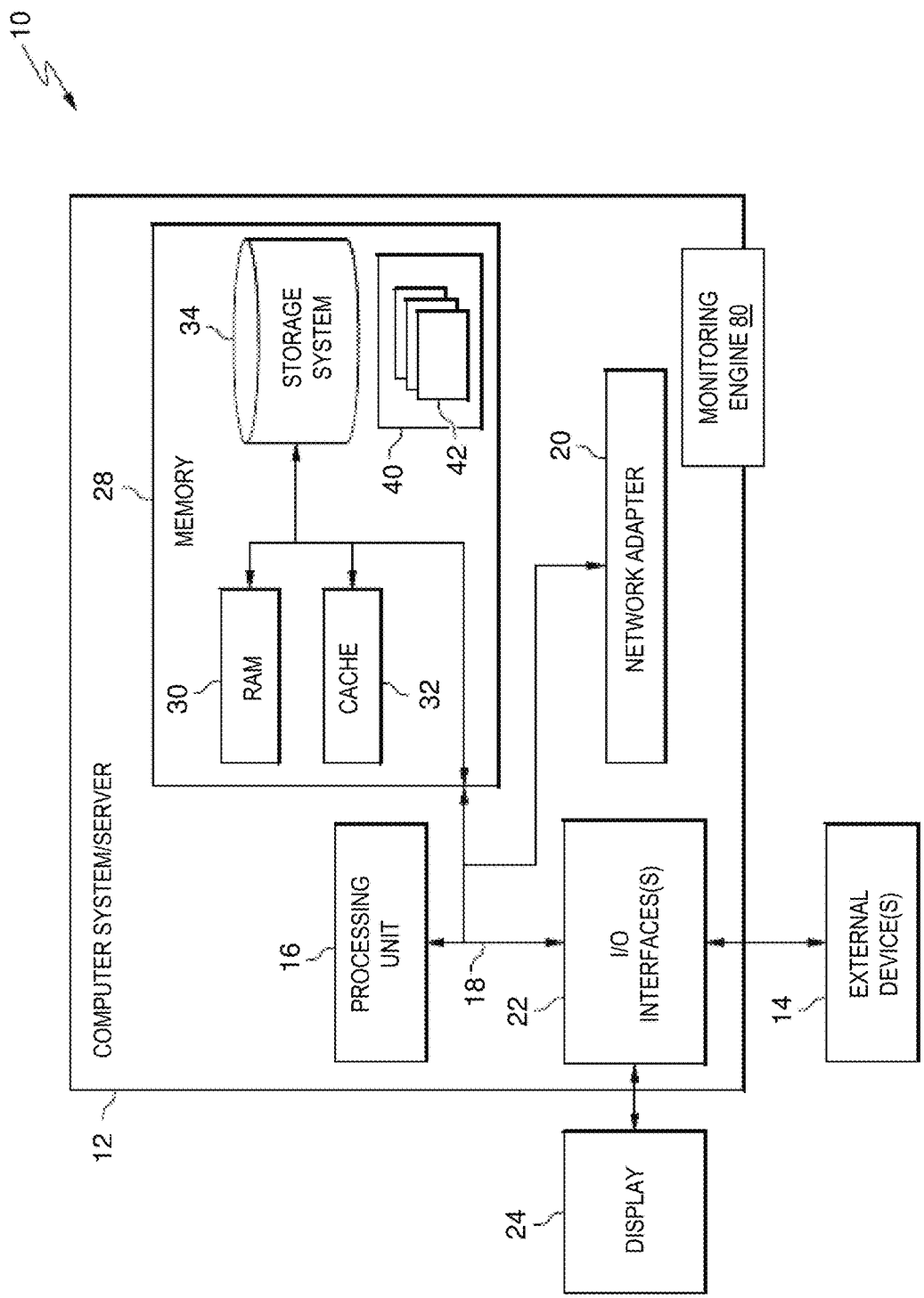
FIG. 1 is an example environment for implementing the steps in accordance with aspects of the present invention.

The present invention generally relates to monitoring performance in a networked environment and, more particularly, to dynamically monitoring performance of different resources in a cloud environment. Aspects described herein include systems and methods to enhance monitoring in a distributed network environment (e.g., a cloud environment) by automatically adjusting monitoring thresholds based on a variety of criteria. In embodiments, the systems and methods dynamically adjust thresholds of monitors for systems in a cloud environment, which enables monitors to automatically adjust to an appropriate threshold when moving between hosts having different performance characteristics. Implementations of the invention thus provide for automatically discovering an optimal monitoring threshold as a virtual image (e.g., virtual machine) is moved within a cloud environment. Implementations of the invention also provide for specifying tight tolerances in a monitoring threshold with reduced, or even eliminated, concern for false alerts.

A service provider in the cloud environment typically has many clients utilizing many different resources. The service provider determines which particular resources are allocated to particular clients, and these allocations may change from time to time while the service provider strives to accommodate the various needs of all the clients simultaneously. As a result, clients frequently see their virtual image (e.g., virtual machine, etc.) moved in a cloud environment from a first infrastructure (e.g., host) to a second infrastructure (e.g., host) that has different performance characteristics than the first infrastructure. Such moves may be initiated by the service provider, for example, in response to changing conditions within the application (such as increased traffic) or to changing conditions within the environment (such as system outages, price changes from the service provider, etc.).

Clients may set up solutions that dynamically respond to pricing, traffic, and environmental conditions of the resources that they provision from the service provider in the cloud environment. Clients may also monitor the performance of the resources that they provision from the service provider in the cloud environment. However, moving a client's virtual image/machine from a first infrastructure to a second infrastructure often frustrates such monitoring by, for example, producing false positives and/or missing actual negatives in the monitoring.

In embodiments, when a virtual machine is moved (e.g., migrated) from a first resource to a second resource, a monitoring threshold for the second resource is automatically determined. The monitoring threshold for the second resource may be determined by adjusting a monitoring threshold of the first resource based on a comparison of performance characteristics of the first resource and the second resource. The first and second resources may be, for example, different hosts in a cloud environment. The monitoring threshold may be based on, for example, response times of the hosts or any other suitable monitoring metric. In this manner, when a client's virtual machine is migrated from a first host to a second host that has different performance characteristics than the first host, a monitoring threshold for the second host is determined based on both: (i) a previous monitoring threshold for the first host, and (ii) a comparison of the performance characteristics between the first host and the second host.

In additional embodiments, a determination is made as to whether a move of a client's virtual machine from a current (first) host to a new (second) host is acceptable. The determination may be based on a comparison of the performance characteristics between the current host and the new host. A plurality of potential new hosts may be evaluated using the comparison, and an optimal new host may be selected from the potential new hosts based on the evaluation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of a monitoring engine 80 may be implemented as one or more of the program modules 42. Additionally, the monitoring engine 80 may be implemented as separate dedicated processors or a single or several processors to provide the functionality described herein. In embodiments, the monitoring engine 80 performs one or more of the processes described herein, including but not limited to: determining an adjusted monitoring threshold when a virtual machine is moved to a new host; and evaluating a proposed move of a virtual machine to a new host.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
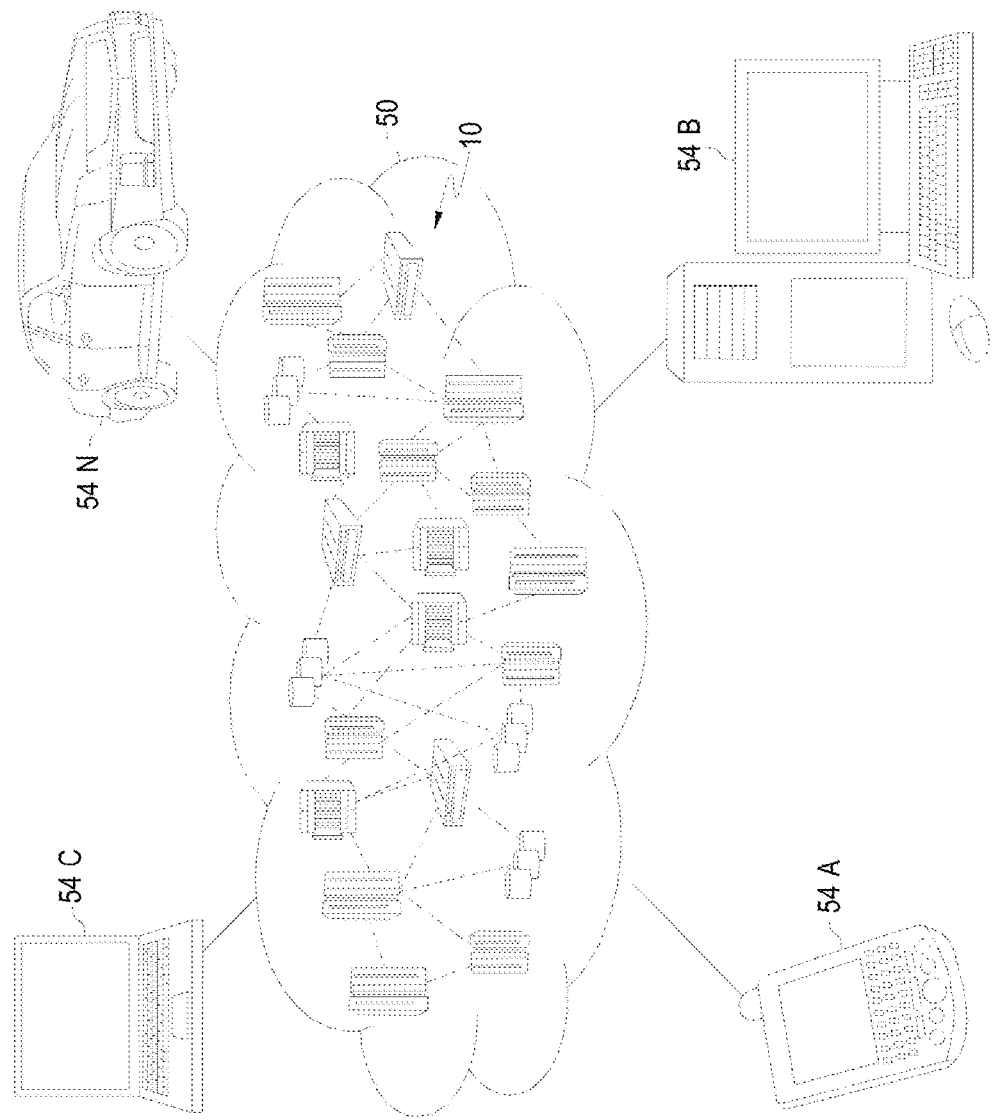
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
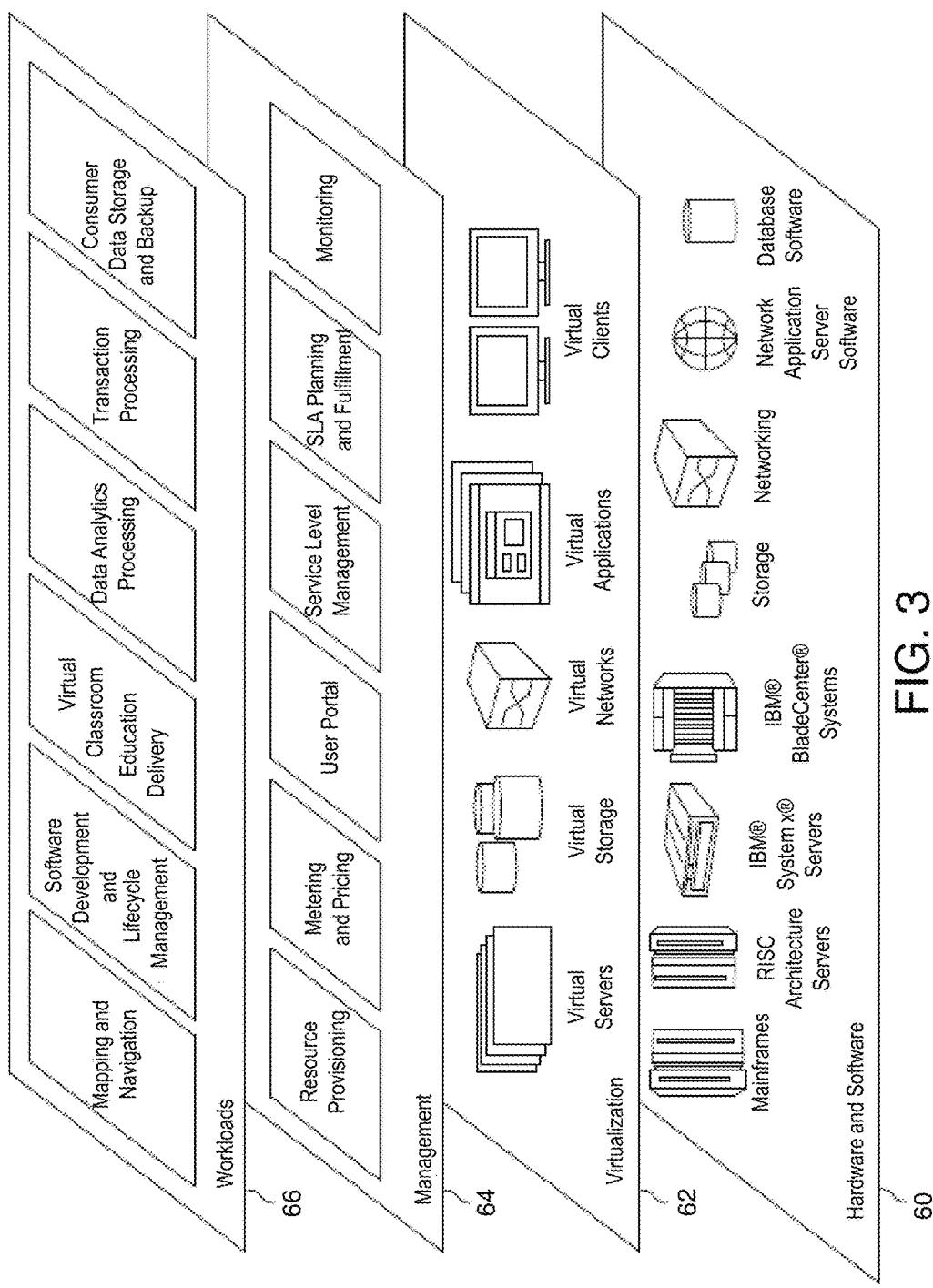
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Monitoring may include one or more of the processes of the monitoring engine 80 described herein, including but not limited to: determining an adjusted monitoring threshold when a virtual machine is moved to a new host; and evaluating a proposed move of a virtual machine to a new host.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup.

As will be appreciated by one skilled in the art, aspects of the present invention, including the monitoring engine 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 4:
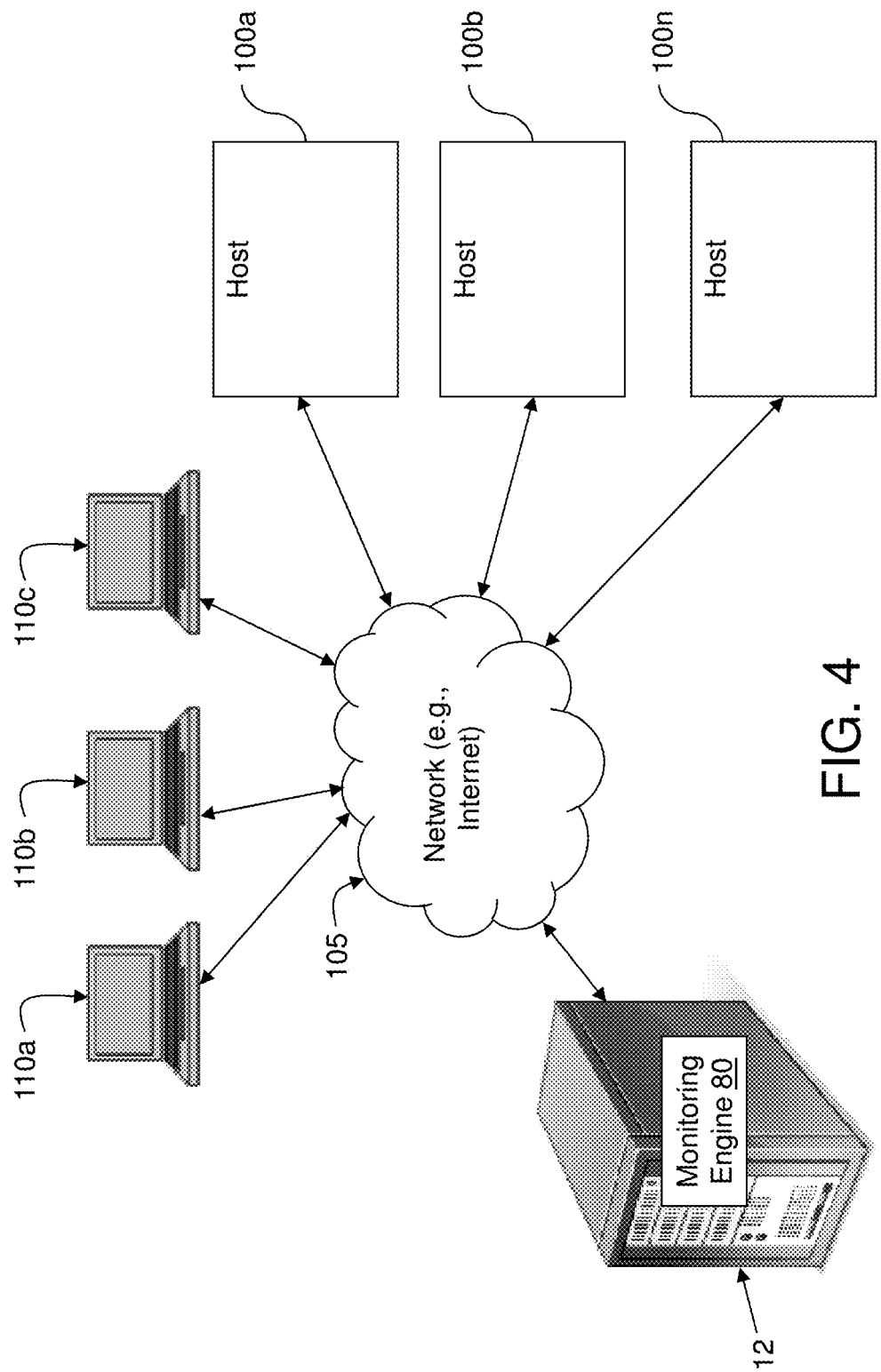

FIG. 4 depicts a diagrammatic representation of resource monitoring in accordance with aspects of the invention. In embodiments, any number of hosts 100a, 100b, . . . , 100n reside in a network 105, e.g., the Internet. Each host 100a, 100b, . . . , 100n may comprise a node in the cloud, as depicted in FIG. 2, and may be provisioned to one or more clients as allocated by a cloud service provider. For example, a client that owns and/or operates a website may utilize one of the hosts, e.g., host 100a, to run a virtual machine that functions as a website server for the client website. When a host, e.g., host 100a, runs a virtual machine that functions as a website server for the client website, the host receives website requests from browsers of user computer devices 110a, 110b, . . . , 110n, and serves the website data to the user computer devices. The user computer devices 110a, 110b, . . . , 110n may be similar to local computing devices 54A-N as described with respect to FIG. 2. The cloud service provider may initially provision a first host, e.g., host 100a, to host the client virtual machine, and subsequently move the client virtual machine to a second host, e.g., host 100b, for various reasons such as load balancing, maintenance, pricing, etc.

Still referring to FIG. 4, in accordance with aspects of the invention, a computer system/server 12 runs or communicates with the monitoring engine 80 (e.g., as described with respect to FIG. 1). The computer system/server 12 and monitoring engine 80 may be associated with a node 10 in the cloud (e.g., as depicted in FIG. 2), and may communicate with the hosts 100a, 100b, . . . , 100n via the network 105. In embodiments, the monitoring engine 80 includes at least one of a migration notification component and a threshold calculation component.

In accordance with aspects described herein, the migration notification component is configured to notify the client (e.g., a website owner) when the client's virtual machine is migrated from one host to another, e.g., from host 100a to host 100b. The notification may comprise, for example, the monitoring engine 80 sending an electronic message to a computing device of the client, which may be one of user computer devices 110a or another computer device connected to the network 105. Along with the notification, the migration notification component may also transmit metadata associated with the hosts to the client. The metadata may include, but is not limited to: date and time of the move (migration) from the first host to the second host; first (previous) host specifications; second (new) host specifications; number of other instances (e.g., other virtual machines) on the first host and/or second host. Host specifications may include, for example: network hops; network latency; CPU performance, such as cycles per second; memory performance, such as pages per second; I/O performance, such as I/O reads per second (where I/O is Input/Output). The metadata may be obtained by the monitoring engine 80 from each host in either a push or pull communication between the components.

In accordance with additional aspects described herein, the threshold calculation component is configured to determine a new metric that is used in monitoring the performance of a new host when the client's virtual machine is migrated from a previous host to the new host, e.g., from host 100a to host 100b. The new metric may be determined based on one of several methods. The metric may be used to monitor the performance of the host that is currently hosting the virtual machine. The metric may be any suitable metric including but not limited to a threshold value of a performance aspect of the virtual machine, such as: a threshold value of host response time to a website request (e.g., from a browser) in milliseconds (ms); a threshold value of host disk I/O's per second; a threshold value of host data transfer rate in Mbps, etc.

In an illustrative example of the threshold calculation component, consider a client whose website server is running as a virtual machine on host 100a that historically responds to a website request in an average of 200 ms. Based on this historical average response time, the metric is a monitoring threshold for host 100a that is set at 300 ms. The monitoring engine 80 uses this monitoring threshold to monitor the performance of the host 100a that is hosting the client's virtual machine. Specifically, in the event the host 100a takes longer than the threshold, e.g., longer than 300 ms, to respond to a website request, the monitoring engine 80 sends an alert to the client computer device informing the client of the failure to comply with the threshold. The client may pursue some form of remedial action based on receiving one or more such alerts.

Still referring to the same example, now consider that the cloud service provider migrates the client's virtual machine (e.g., website server) from the first host 100a to a second (new) host 100b. Due to structural and/or environmental differences, the second host 100b likely has different performance characteristics than the first host 100a. For example, the second host 100b may differ from the first host 100a in at least one of the following performance characteristics: network hops; network latency; CPU performance, such as cycles per second; memory performance, such as pages per second; I/O performance, such as I/O reads per second. As a result of the performance differences between the first and second hosts, it may be disadvantageous to apply the monitoring threshold of the first host, e.g., 300 ms, to the second host. For example, the second host 100b may have a standard response time of 150 ms, in which case applying the monitoring threshold of 300 ms to the second host 100b would not generate alerts in many instances when the second host is underperforming (e.g., missed alerts). In such a circumstance, it would be more reasonable to apply a lower monitoring threshold (e.g., 250 ms) to the second host. As another example, the second host 100b may have a standard response time of 350 ms, in which case applying the monitoring threshold of 300 ms to the second host 100b would generate alerts when the second host is operating normally (e.g., false positive alerts). In such a circumstance, it would be more reasonable to apply a higher monitoring threshold (e.g., 450 ms) to the second host.

Accordingly, the threshold calculation component of the monitoring engine 80 is configured to determine an adjusted monitoring threshold when a resource (e.g., a virtual machine) is moved from one host to another. In embodiments, the determining the adjusted monitoring threshold includes determining a multiplier based on a comparison of the first host to the second host. The comparison may be based on any one or more performance characteristics of the first and second hosts. In but one example, the comparison is performed in a manner described with respect to FIGS. 5 and 6. After determining the multiplier, the adjusted monitoring threshold is calculated by multiplying the first monitoring threshold (e.g., of the first host) by the multiplier. The result is an adjusted monitoring threshold (e.g., a second monitoring threshold) that is used to monitor the performance of the second host. In this manner, the second monitoring threshold is determined based on: (i) the first monitoring threshold, and (ii) a comparison of the first host to the second host. The adjusted monitoring threshold in accordance with aspects of the invention enables the client to maintain effective and reasonable monitoring thresholds in an environment that is dynamically optimizing for resiliency, capacity, or price.

In embodiments, the monitoring engine 80 is configured to permit a client to define a minimum threshold and/or a maximum threshold that overrides the determined adjusted monitoring threshold. For example, a client may define a maximum monitoring threshold as 500 ms for response time. In the event the monitoring engine 80 determines an adjusted monitoring threshold (e.g., 550 ms) that exceeds the user defined maximum monitoring threshold (e.g., 500 ms), the monitoring engine 80 would then use the user defined maximum monitoring threshold as the monitoring threshold for the new host.

FIGS. 5 and 6 depict diagrammatic representations of resource monitoring in accordance with aspects of the invention. In particular, FIGS. 5 and 6 show a "traffic triangle" that may be used to compare the performance of a first host to the performance of a second host, e.g., for determining an adjusted monitoring threshold as described with respect to FIG. 4. As shown in FIGS. 5 and 6, a geometric triangle represents a cloud resource transition. Two origin nodes 500a and 500b represent resources that serve for edge clients. One origin 500a is the first node that hosts a resource while the second origin 500b is the new destination for the resource. The edge node 510 accepts traffic and allocates cloud resources on the origin nodes. The collection of edges 511, 512, 513 between the nodes 500a, 500b, 510 creates a triangle.

In embodiments, origin 500a corresponds to host 100a of FIG. 4 (e.g., a first host that hosts a virtual machine of a client), and origin 500b corresponds to host 100b of FIG. 4 (e.g., a second host to which the virtual machine is being migrated from the first host). Edge node 510 represents a node in the network (e.g. network 105) through which all traffic to the virtual machine is routed. For example, when the virtual machine is a website server, all website requests may be routed through edge node 510 on the way to the host. In embodiments, the edge node 510 is the computer system/server 12 (see FIG. 1) running the monitoring engine 80, or alternatively is a node that communicates with the monitoring engine 80.

With continued reference to FIG. 5, the function fe_on (Xn) is a function that provides the magnitude (e.g., length) of an edge between the edge node 510 and one of the origins 500a or 500b. For example, function fe_o1(X1) provides the magnitude of an edge 511 between the edge node 510 and origin 500a, and function fe_o2(X2) provides the magnitude of an edge 512 between the edge node 510 and origin 500b. Similarly, function fo1_o2(X3) provides the magnitude of an edge 513 between origin 500a and origin 500b. The function "f" may be any suitable mathematical function that provides an edge length based on vector "Xn". For example, the function may be a summing function of quantified values of components of the vector, a summing of a square root of a sum of squares of the quantified values, or any other desired function.

In embodiments, the vector "Xn" is defined in terms of performance characteristics of the host "n". For example, "Xn" may be based on a combination of vector components, wherein each component is a quantified value of a performance characteristic. Exemplary performance characteristics that may be used as components of the vector include: network hops; network latency; CPU performance, such as cycles per second; memory performance, such as pages per second; I/O performance, such as I/O reads per second. More specifically, vector "X1" may be a combination of quantified values of: number of network hops between edge node 510 and origin 500*a*; network latency between edge node 510 and origin 500*a*; number of CPU cycles per second of origin 500*a*; number of memory pages per second of origin 500*a*; and number of I/O reads per second of origin 500*a*. Similarly, vector "X2" may be a combination of quantified values of: number of network hops between edge node 510 and origin 500*b*; network latency between edge node 510 and origin 500*b*; number of CPU cycles per second of origin 500*b*; number of memory pages per second of origin 500*b*; and number of I/O reads per second of origin 500*b*. Further, vector "X3" may be defined as a delta (difference) of corresponding values of the vectors "X1" and "X2". The quantified values of the individual components of the vectors are determined by the monitoring engine 80, e.g., by requesting information from the origins, analyzing the network, etc. The vectors are not limited to the exemplary components described here, and any desired components may be used.

As depicted in FIG. 6, each of the components of the vector "Xn" may be a positive contributor (e.g., xi components 605) or a negative contributor (e.g., zi components 610) towards the edge length. The xi components 605 contribute positively to the length of the edge, while zi components 610 negatively. Further, depending on the importance of a component or resource scheme, the quantified value of each component within the vector can be weighted and/or normalized, e.g., by the monitoring engine 80 when the monitoring engine 80 is determining the respective quantified values. For example, a shorter edge of the traffic triangle could represent smaller network hops yet smaller CPU differences between the two origins. The lengths of edges 511-513 shown in FIGS. 5 and 6 are determined by the monitoring engine 80 using the function "f" and the vectors "X1", "X2", and "X3" as described herein.

Still referring to FIG. 6, when lengths of edges 511-513 are calculated, e.g., when all of the side lengths of the traffic triangle are known, the angles A, B, C of the traffic triangle between the nodes can be determined with the law of cosines or sines 615. In embodiments, the monitoring engine 80 is configured to determine the angles A, B, C based on the determined lengths of the edges 511-513. The angles A, B, C of the traffic triangle represent how different the corresponding nodes are relative to each other.

According to aspects of the invention, the monitoring engine 80 is configured to compare at least one of the determined angles A, B, C to a predefined threshold in evaluating a move from one origin (host) to another. Information regarding a move of a particular resource from one origin to another is encoded by the angle. For example, if angle A is too large or too small, e.g., as defined by acceptable thresholds of angle size, a transition to the new origin is deemed unacceptable and preferably not made. As a result, when a move to a new host is optional (not mandatory), the monitoring engine 80 may be configured to permit the move only when the determined angle A is within an acceptable range defined by thresholds. On the other hand, when a move to a new host is mandatory, the monitoring engine 80 may be configured to determine a respective angle A for each of a plurality of potential new hosts, and select an optimal host to move to based on the determined angles A.

In aspects of the invention, the vectors "X1" and "X2" may be used to determine an adjusted monitoring threshold as described with respect to FIG. 4. In embodiments, when a client virtual machine is migrated from origin 500*a* (e.g., first host 100*a*) to origin 500*b* (e.g., second host 100*b*), the monitoring engine 80 determines an adjusted monitoring threshold to use with origin 500*b* based on: a monitoring threshold used with origin 500*a*, and a comparison of origin 500*a* to origin 500*b* provided by vectors "X1" and "X2". For example, assume that origin 500*a* hosts a website server for a client and the client uses a monitoring threshold of 300 ms response time for origin 500*a*. When the client website server is moved to origin 500*b*, the monitoring engine 80 gathers appropriate data about origin 500*a* and origin 500*b* for constructing the vectors "X1" and "X2". In this example, assume the determined magnitude of vector "X1" is 27 and the determined magnitude of vector "X2" is 23 based on quantified values of the vector components (e.g., network hops, network latency, CPU cycles, memory pages, I/O reads, etc.) determined by the monitoring engine 80. The ratio of "X1" to "X2" is determined as 27/23=1.17. The adjusted monitoring threshold for the client's website server on origin 500*b* may then be determined as this ratio (1.17) multiplied by the threshold that was used with origin 500*a*, such that the adjusted monitoring threshold=300 ms*1.17=352 ms. The determined adjusted monitoring threshold is then used as the threshold for monitoring the response time of the web site server while the web site server is hosted on origin 500*b*. A different adjusted monitoring threshold may be determined in a similar manner when the client's website server migrates from origin 500*b* to another host.

FIGS. 7 and 8 show exemplary flow diagrams of processes in accordance with aspects of the invention. The steps of FIGS. 7 and 8 may be implemented in the environments of and using the functionality described with respect to one or more of FIGS. 1-4, for example.

FIG. 7 is an example flow for determining an adjusted monitoring threshold in accordance with aspects of the present invention. At step 705, a monitoring engine (e.g., monitoring engine 80 running on a computing device) monitors a first host using a first monitoring metric. In embodiments, the first host is a resource of a distributed network (e.g., cloud) environment, such as host 100*a* of FIG. 4. In aspects of the invention, the host is running a virtual machine of a client, such as a website server or other virtual machine as described herein. The monitoring metric may be a monitoring threshold value associated with any suitable host performance aspect, such as: host response time to a website request (e.g., from a browser) in milliseconds (ms); host disk I/O's per second; host data transfer rate in Mbps, etc. The monitoring engine may be configured to generate an alert when the measured performance of the host violates the monitoring metric, e.g., when the host response time for a website request exceeds the monitoring threshold value for response time.

At step 710, the virtual machine is migrated from the first host to a second host. In embodiments, the second host is another resource of the same distributed network (e.g., cloud) environment that contains the first host. For example, the second host may correspond to host 100*b* of FIG. 4. In an exemplary implementation, the virtual machine functions as a website server, and the migrating of step 710 entails running the website server at the second host and ceasing running the website server at the first host.

At step 715, the monitoring engine determines a second (e.g., adjusted) monitoring metric for the second host running the virtual machine. In embodiments, the second monitoring metric is determined based on a combination of: (i) the first monitoring metric that was applied to the first host when the first host was running the virtual machine, and (ii)

a comparison of the first host to the second host. The comparison of the first host to the second host may include a comparison based on performance characteristics of the two hosts. In embodiments, the monitoring engine determines a multiplier based on the comparison of the first host to the second host, and determines the second monitoring metric by multiplying the first monitoring metric by the multiplier. The multiplier may be, for example, a ratio of first and second vectors that quantitatively describe the respective performance of each of the first and second hosts, e.g., as described with respect to FIGS. 5 and 6. In embodiments, the second monitoring metric is based on a same performance metric as the first monitoring threshold. For example, when the first monitoring metric is a threshold value of host response time, the second monitoring metric is also a threshold value of host response time.

At step 720, while the second host is running the virtual machine, the monitoring engine monitors the performance of the second host using the second metric that was determined at step 715. The monitoring engine may be configured to generate an alert when the measured performance of the second host violates the second monitoring metric, e.g., when the response time of the second host for a website request exceeds the second monitoring threshold value for response time. The process may return to step 710 in the event the virtual machine is migrated from the second host to a third host.

FIG. 8 is an example flow for monitoring a migration of a virtual machine from a first host to a second host in accordance with aspects of the present invention. At step 805, a monitoring engine (e.g., monitoring engine 80 running on a computing device) receives notice that the virtual machine is being, or will be, moved from a first host to a second host within a distributed network (e.g., cloud) environment. The notice may be provided to the monitoring engine by a provider of the distributed network (e.g., cloud) environment. In aspects, the virtual machine is a website server that is running on the first host. The first host and second host may correspond to host 100a and host 100b, respectively, of FIG. 4.

At step 810, the monitoring engine determines the value of angle A of a traffic triangle containing the first host and the second host, e.g., as described herein with respect to FIGS. 5 and 6. In embodiments, the first host corresponds to origin 500a and the second host corresponds to origin 500b. In embodiments, the monitoring engine constructs a traffic triangle between the first host, the second host, and an edge node (e.g., edge node 510). The monitoring engine then determines a length of each edge of the traffic triangle using performance vectors, e.g., X1, X2, X3 as described with respect to FIGS. 5 and 6. The monitoring engine then determines the value of angle A, e.g., as shown in FIG. 6, using the determined edge lengths and the law of sines or the law of cosines.

At step 815, the monitoring engine determines whether the determined value of angle A is within an acceptable range. For example, the monitoring engine may store a lower limit and an upper limit that define a range of acceptable values for the determined value of angle A. When the determined value of angle A is greater than the lower limit and less than the upper limit, the determined value of angle A is deemed to be acceptable and the process proceeds to step 820 where the move to the second host is accepted. When the determined value of angle A is less than the lower limit or greater than the upper limit, the determined value of angle A is deemed to be unacceptable and the process proceeds to step 825 where it is determined whether the move (indicated at step 805) is mandatory or optional. For example, when the network provider notifies the monitoring engine of the anticipated move (e.g., at step 805), the network provider may also indicate that the move away from the first host is mandatory or optional. In the event that the move is optional, then at step 830 the monitoring engine prevents the move. For example, the monitoring engine may communicate to the network provider that the client has declined to move their virtual machine away from the first host, in which case the virtual machine continues to run on the first host. On the other hand, when the move is mandatory (i.e., not optional), the process proceeds to step 835.

At step 835, the monitoring engine determines an optimal new host to which to migrate the virtual machine based on determined angles of a plurality of potential new hosts. In embodiments, the monitoring engine determines a plurality of potential new hosts by analyzing available hosts within the same network as the first host and the second host, e.g., other hosts (e.g., host 100n) within the cloud environment to which it is possible to migrate the virtual machine that is currently running on the first host. The plurality of potential new hosts includes at least a third host, and may include any number of hosts such as a fourth host, fifth host, etc. In embodiments, for each one of the potential new hosts, the monitoring engine constructs a traffic triangle for the potential new host relative to the first host and the edge node, e.g., in a manner similar to that performed for the second host at step 810. For example, the monitoring engine constructs a traffic triangle between the first host, the edge node and a third host, and another traffic triangle between the first host, the edge node and a fourth host, etc. In this manner, the monitoring engine determines a respective angle A for each of the potential new hosts. The monitoring engine then selects an optimal new host based on comparing the determined angles of each of the potential new hosts. For example, the monitoring engine may select the optimal new host as the host that has the smallest value of angle A.

It is noted that the second host and its determined angle A (e.g., from step 810) may be included in the comparison at step 835. For example, although the angle A of the second host was determined to be outside an acceptable range at step 815, it may be the case that the second host is a better option than the other potential new hosts, e.g., as indicated by the angle A of the second host being smaller than the angle A of each of the other potential new hosts.

At step 840, the virtual machine is migrated from the first host to the optimal new host that was determined at step 835. In an exemplary implementation, the virtual machine functions as a website server, and the migrating of step 840 entails running the website server at the optimal new host and ceasing running the website server at the first host.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for monitoring performance in a networked environment, comprising:
   a hardware CPU, a hardware computer readable memory and a hardware computer readable storage medium;
   program instructions to determine a length of a first edge of a traffic triangle based on a first vector that includes components associated with quantified performance characteristics of a first host which is comprised of a first hardware infrastructure;
   program instructions to determine a length of a second edge of the traffic triangle based on a second vector that includes components associated with quantified performance characteristics of a second host which is comprised of a second hardware infrastructure;
   program instructions to determine a multiplier based on a comparison of the length of the first edge of the traffic triangle to the length of the second edge of the traffic triangle;
   program instructions to multiply a monitoring threshold associated with the first host by the multiplier to calculate an adjusted monitoring threshold; and
   program instructions to determine a monitoring threshold for the second host when a virtual machine is moved between the first host and the second host, wherein the monitoring threshold for the second host is based on both the monitoring threshold associated with the first host and a comparison between the quantified performance characteristics of the first host and the second host,
   wherein the program instructions are stored on the hardware computer readable storage medium for execution by the hardware CPU via the hardware computer readable memory.

2. The system of claim 1, wherein the quantified performance characteristics of the first host and the quantified performance characteristics of the second host include at least one of: network hops; network latency; CPU performance; memory performance; and I/O performance.

3. The system of claim 1, further comprising program instructions to:
   identify a plurality of potential new hosts for a move;
   for each one of the plurality of potential new hosts, determine a respective angle of a respective traffic triangle including the first host, the one of the plurality of potential new hosts, and an edge node of the traffic triangle; and
   select an optimal one of the plurality of potential new hosts based on the determined respective angles.

4. The system of claim 3, wherein the plurality of potential new hosts includes the second host.

5. The system of claim 1, further comprising program instructions to receive notice of of the movement of the virtual machine from the first host to the second host, wherein the virtual machine comprises a website server, and the first host and the second host are separate cloud computing nodes in a cloud computing environment.

6. The system of claim 5, further comprising an edge node being a node in the networked environment through which traffic to the virtual machine is routed.

7. The system of claim 1, wherein the traffic triangle including the first host, the second host, and an edge node corresponds to a cloud resource transition.

8. The system of claim 1, further comprising an edge node being a hardware node in the networked environment.

9. The system of claim 5, further comprising program instructions to determine whether the move is acceptable based on comparing an angle of the traffic triangle to at least one threshold, wherein the at least one threshold comprises a lower limit and an upper limit.

10. The system of claim 9, wherein the move is acceptable in response to the angle of the traffic triangle being greater than the lower limit and less than the upper limit.

11. The system of claim 9, wherein the move is prevented in response to the angle of the traffic triangle being less than the lower limit or greater than the upper limit.

12. The system of claim 5, further comprising determining whether the move is mandatory.

13. The system of claim 12, further comprising determining an optimal new host based on another traffic triangle which includes the first host, an edge node, and a third host in response to the move being mandatory.

14. The system of claim 13, further comprising program instructions to determine the monitoring threshold associated with the first host based on a historical average response time.

15. The system of claim 14, wherein the second host has different quantified performance characteristics than the first host.

16. The system of claim 15, wherein the second host differs from the first host in at least one of the following performance characteristics: network hops; network latency; CPU performance, such as cycles per second; memory performance, such as pages per second; and I/O performance, such as I/O reads per second.

17. The system of claim 16, further comprising program instructions to define a minimum threshold and a maximum threshold which override the calculated adjusted monitoring threshold.

18. The system of claim 17, further comprising program instructions to transmit metadata associated with the first host and the second host when a virtual machine is migrated from the first host to the second host.

19. The system of claim 18, wherein the metadata includes date and time of the migration from the first host to the second host; specifications of the first host; specifications of the second host; number of other virtual machines on the first host and/or the second host.

* * * * *